United States Patent [19]

Nakaya et al.

[11] Patent Number: 5,485,971
[45] Date of Patent: Jan. 23, 1996

[54] SEAT BELT RETRACTOR

[75] Inventors: Hidekazu Nakaya, Osaka; Toshihiro Amatsu, Suita, both of Japan

[73] Assignee: Ashimori Kogyo Kabushiki Kaisha, Osaka, Japan

[21] Appl. No.: 211,969

[22] PCT Filed: Sep. 7, 1993

[86] PCT No.: PCT/JP93/01260

§ 371 Date: Apr. 21, 1994

§ 102(e) Date: Apr. 21, 1994

[87] PCT Pub. No.: WO94/05528

PCT Pub. Date: Mar. 17, 1994

[30] Foreign Application Priority Data

Sep. 7, 1992 [JP] Japan .................. 4-69077 U

[51] Int. Cl.⁶ .................. B60R 22/405; B60R 22/42
[52] U.S. Cl. .................. 242/381.1; 242/383.4; 242/384.6
[58] Field of Search .................. 242/383.4, 383.2, 242/383.3, 383.5, 384, 384.1, 384.2, 384.3, 384.4, 384.5, 384.6, 381.1, 381.4; 280/806, 808; 297/478, 480; 74/577 M, 577 SF

[56] References Cited

U.S. PATENT DOCUMENTS

| | | | |
|---|---|---|---|
| 3,836,171 | 9/1974 | Hayashi et al. | 242/384 |
| 4,069,987 | 1/1978 | Fisher | 242/384.6 |
| 4,071,204 | 1/1978 | Booth | 242/383.4 X |
| 4,094,475 | 6/1978 | Takada | 242/384.5 X |
| 4,687,253 | 8/1987 | Ernst et al. | |
| 5,044,575 | 9/1991 | Knabel et al. | |
| 5,137,226 | 8/1992 | Fujimura et al. | |
| 5,154,368 | 10/1992 | Fujimura et al. | |
| 5,156,356 | 10/1992 | Fujimura et al. | |

FOREIGN PATENT DOCUMENTS

| | | |
|---|---|---|
| 0186105 | 7/1986 | European Pat. Off. . |
| 59-161842 | 10/1984 | Japan . |
| 61-205532 | 9/1986 | Japan . |
| 61-205531 | 9/1986 | Japan . |
| 1111553 | 4/1989 | Japan . |
| 2147456 | 6/1990 | Japan . |
| 532176 | 3/1993 | Japan . |

*Primary Examiner*—John M. Jillions
*Attorney, Agent, or Firm*—Birch, Stewart, Kolasch & Birch

[57] ABSTRACT

This invention relates to locking means for a seat belt retractor equipped with an emergency lock which, in an emergency, locks the withdrawal of webbing.

The locking means of the retractor includes a ratchet wheel (16) and a pawl (32). The pawl has two teeth, and the pawl and the ratchet wheel are positioned in such a way that when the load on the webbing is relatively small only one of the teeth of the pawl engages with a tooth of the ratchet wheel and there is a small gap between the other tooth of the pawl and the tooth of the ratchet wheel corresponding thereto. When the load on the webbing is relatively large both of the teeth of the pawl engage with teeth of the ratchet wheel. As a result, because the load on each tooth is half of what it is when the pawl has one tooth only, twice the torque can be withstood and the diameter of the ratchet wheel can be reduced.

7 Claims, 10 Drawing Sheets

FIG.10 though the invention relates to a

SEAT BELT RETRACTOR

TECHNICAL FIELD

The present invention relates to a seat belt retractor for a vehicle. More particularly, the present invention relates to a seat belt retractor equipped with an emergency locking mechanism for sensitively detecting sudden changes in acceleration during vehicle collisions, etc., locking the rotation of the webbing reel shaft and thereby locking the withdrawal of the webbing therefrom.

BACKGROUND ART

Seat belt devices of vehicles and the like generally have a construction wherein a webbing is wound on a retractor provided with an emergency locking mechanism. In this kind of seat belt device, when the vehicle crashes or stops suddenly the emergency locking mechanism detects acceleration changes caused by collision impact forces and operates to stop the rotation of the reel shaft on which the webbing is wound so that withdrawal of the webbing is arrested and the passenger's body is restrained.

Examples of publications relating to this type of retractor include JP U 5-32176, U.S. Pat. Nos. 5,137,226, 5,154,368, 5,156,356, and numerous others.

To ensure their safety, seat belt retractor strength requirements are stipulated by law. With the kind of conventional mechanism described above, which uses a pawl having one tooth, it has not been possible to reduce the size of the ratchet wheel while still satisfying these strength requirements, and consequently it has naturally also been difficult to reduce the size of the retractor.

However, in recent years, 3-point type seat belts having retractors equipped with emergency lock mechanisms have also come to be widely used for the rear seats of passenger vehicles, and, from the point of view of the space required for installing the retractor, the need to reduce the size of the retractor has become greater.

A first object of the present invention is to provide means by which the retractor can be made more compact.

The present invention also relates to a so-called direct-lock retractor, wherein in a retractor equipped with an emergency locking mechanism, during an emergency, as well as the webbing reel shaft being locked the webbing that has been withdrawn from the webbing reel shaft is also clamped so that the withdrawal of the webbing is arrested.

In general, emergency-lock type seat belt retractors are designed to restrain the body of the wearer of the seat belt during an emergency by arresting the withdrawal of the webbing by locking the webbing reel shaft.

However, with this type of retractor there has been the problem that even when the rotation of the webbing reel shaft is locked, when the webbing is subjected to a large load the webbing itself wound on the webbing reel shaft becomes more tightly wound and a further short length of webbing is withdrawn.

In order to solve this problem, clamping means has been mounted with the part of the webbing that has been withdrawn from the webbing reel shaft so that the withdrawal of the webbing from the webbing reel shaft can be arrested by the clamping means moving in cooperation with the webbing reel shaft locking means and clamping the webbing.

A second object of the present invention is to provide a retractor in which, in basically the same actuation mechanism as a conventional retractor, the moving distance of a first clamp member is increased without the pivot angle of an actuating lever being increased, so that the webbing is clamped rapidly.

DISCLOSURE OF THE INVENTION

The seat belt retractor of the present invention will be described below.

To achieve the first object mentioned above, the following retractor is provided:

A seat belt retractor for mounting on a vehicle body, comprising: a frame; a webbing reel shaft rotatably mounted on the frame; a lock plate rotatably mounted on the webbing reel shaft; inertial detecting means for detecting acceleration of the vehicle body, abnormal inclination of the vehicle body and/or rapid rotation of the webbing reel shaft in the webbing withdrawal direction and linking the lock plate to the webbing reel shaft; and locking means for locking the rotation of the webbing reel shaft when actuated by a rotation of the lock plate which accompanies a rotation of the webbing reel shaft when the lock plate and the webbing reel shaft are linked together, the locking means comprising a ratchet wheel which rotates integrally with the webbing reel shaft and a pawl pivotally mounted on the frame and urged away from the ratchet wheel which pawl engages with the ratchet wheel guided by a guide hole formed in the lock plate; wherein the pawl comprises two teeth and the pawl and the ratchet wheel are positioned in such a way that when the load on the webbing is relatively small only one of the teeth of the pawl engages with a tooth of the ratchet wheel and there is a small gap between the other tooth of the pawl and the tooth of the ratchet wheel corresponding thereto and when the load on the webbing is relatively large both of the teeth engage with teeth of the ratchet wheel.

To achieve the second object, the following retractor is provided:

A seat belt retractor provided with a clamp device mounted with the webbing withdrawn from the webbing reel shaft passing through it and a clamp actuator arm for actuating the clamp device by moving in linkage with the rotation of the lock plate, the clamp device comprising first and second clamp members disposed facing each other with the webbing between them and a clamp case for holding the first clamp member in such a way that it can move toward and away from the second clamp member and holding both of the clamp members in such a way that they can simultaneously move in the direction of the length of the webbing, which clamp actuator arm is pivotally mounted on the frame and has its end portion fitted in a channel in the first clamp member and moving in linkage with the lock plate pivots in the webbing withdrawal direction and pushes the first clamp member toward the second clamp member; wherein the end portion of the clamp actuator arm has a circular arcuate surface which in cross section forms part of a circle having a diameter greater than the thickness of this end portion and having its center inclined to the webbing reel shaft from the centerline of the clamp actuator arm.

In the retractor for achieving the first object, the tooth pitch of the pawl and the tooth pitch of the ratchet wheel are made to differ slightly.

Also, the guide hole engages with a support pin mounted on the pawl and is shaped so that the two teeth of the pawl move rapidly to the addendum circle of the ratchet wheel and then slow down before engaging with the ratchet wheel.

Also, the portion of the guide hole where the support pin is when the pawl and the ratchet wheel are engaged is large.

BRIEF DESCRIPTION OF THE DRAWINGS

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The characteristics of the retractor will now be explained with reference to the accompanying drawings.

Figure 1:
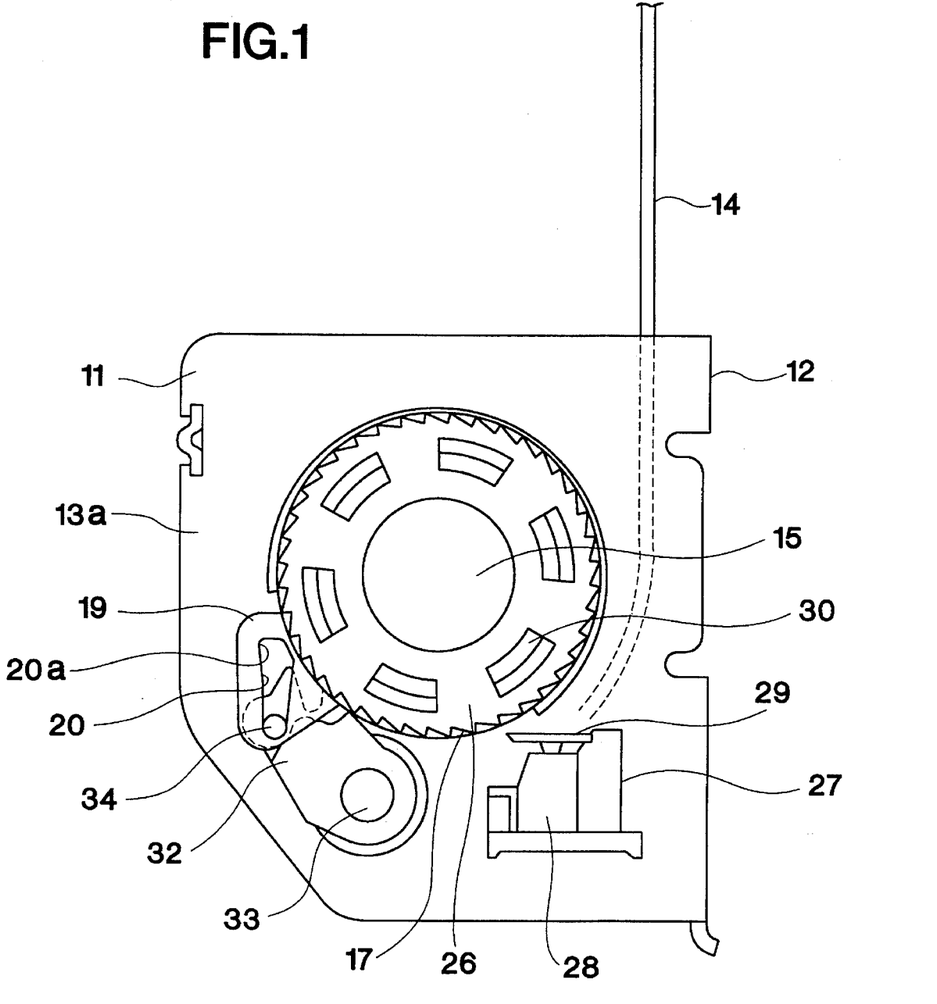
FIG. 1 is a schematic side elevational view illustrating the seat belt retractor of the present invention.
Figure 2:
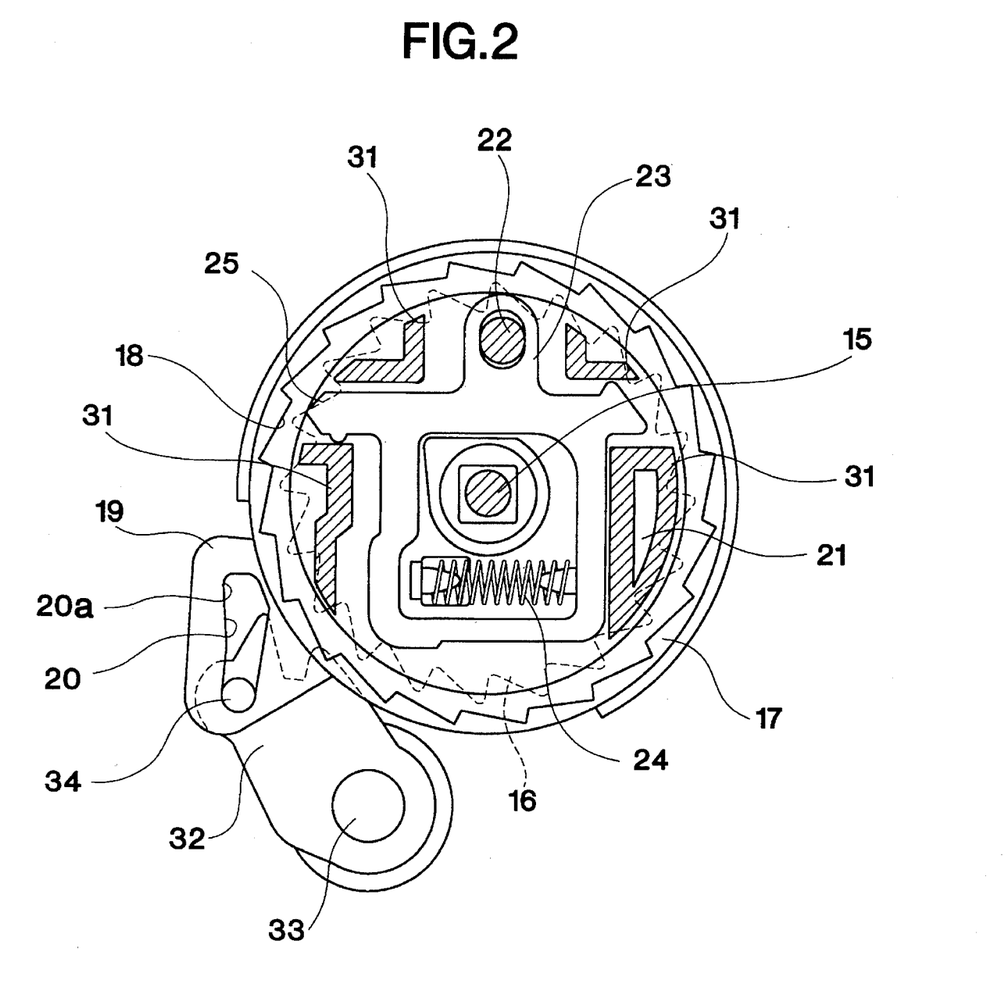
FIG. 2 is a longitudinal sectional view of a primary part of the seat belt retractor of the present invention.

In FIG. 1, reference numeral 11 denotes a frame.

The frame 11 comprises a back plate 12 for mounting the retractor on a vehicle body and side plates 13a, 13b formed by bending as extensions of the back plate 12 extending perpendicularly from the side edges thereof so that they face each other.

A reel shaft 15 which takes up a webbing 14 is rotatably mounted between the two side plates 13a, 13b of the frame 11. The reel shaft 15 is rotationally urged in the direction in which it takes up the webbing 14 on its periphery.

A ratchet wheel 16 is fixed to an end portion of the reel shaft 15 which projects outward through the side plate 13a, and the ratchet wheel 16 rotates integrally with the reel shaft 15.

A lock plate 17 which is rotatable coaxially with the reel shaft 15 is mounted on the end portion of the reel shaft 15 which projects outward through the side plate 13a. An internal ratchet 18 is formed on an inner circumferential periphery of the lock plate 17.

A guide plate 19 is formed as an extension of the lock plate 17 extending from the peripheral circumferential edge thereof. A guide hole 20 for guiding a pawl 32 is formed in the guide plate 19.

The shape of this guide hole 20 is such that as the lock plate 17 pivots the pawl 32, at first rapidly as it approaches the ratchet wheel 16 and then decelerates before engaging with the ratchet wheel. That is, according to the position of the reel shaft 15 and the position of a pawl pivot 33 and the like, the guide hole 20 is of a shape such that it curves away from the reel shaft. Also, the portion of the guide hole 20 near the reel shaft is made wide and constitutes a large hole portion 20a.

A plate 21 is mounted on the end of the reel shaft 15 in such a way as to rotate integrally therewith. A pin 22 is implanted in the plate 21.

A lock member 23 is rotatably supported by the pin 22. The lock member 23 is urged by a spring 24 interposed between the plate 21 and the lock member 23 in a direction in which an engaging claw 25 of the lock member 23 does not engage with the internal ratchet 18.

A latch gear 26 is mounted on the outer side of the lock plate 17 and is rotatable coaxially with the reel shaft 15.

A detector mechanism 27 is mounted on the side plate 13a of the frame 11. This detector mechanism 27 comprises a pendulum 28 which detects acceleration of the car body or abnormal inclination of the car body or the like and inclines and a claw member 29 which rises as the pendulum 28 inclines. When it has risen, this claw member 29 engages with the latch gear 26.

An inertia weight 30 is mounted rotatably coaxially with the reel shaft 15 on the lock plate 17 side of the latch gear 26, and the inertia weight 30 and the latch gear 26 are rotatably frictionally connected.

The inertia weight 30 is provided with projecting portions 31 projecting from the lock plate 17 side. When the engagement of the claw member 29 and the latch gear 26 stops the rotation of the inertia weight 30, these projecting portions 31 act to cause the engaging claw 25 of the lock member 23 to engage with the internal ratchet 18.

The pawl 32 has its base end pivotally supported on the side plate 13a of the frame 11 by the pawl pivot 33.

Two teeth are formed in the distal end of the pawl 32. The pitch of these two teeth may be made slightly different from the tooth pitch of the ratchet wheel 16. When the tooth pitch of the pawl 32 is made slightly different from that of the ratchet wheel 16, in the case of a low load one tooth only engages with the ratchet wheel 16 and in the case of a high load, by elastic deformation, both of the teeth engage with the ratchet wheel 16 and support the load. Compared to the case when the tooth pitch of the pawl 32 and the tooth pitch of the ratchet wheel 16 are equal, the two teeth disengage more smoothly and as smoothly as they do when the pawl 32 and the ratchet wheel 16 are engaged by one tooth only.

The pawl 32 is urged by a spring in the direction in which it does not engage with the ratchet wheel 16.

A support pin 34 implanted in the pawl 32 is inserted through the guide hole 20 in the guide plate 19 formed in the lock plate 17. The arrangement is such that when the lock plate 17 pivots it causes the toothed portion of the pawl 32, guided by the guide hole 20, to engage with the ratchet wheel 16.

When the emergency locking mechanism operates, the lock plate 17 rotates integrally with the reel shaft 15 and causes the pawl 32, guided by the guide hole 20, to pivot in the direction in which it engages with the ratchet wheel 16. When the pawl 32 has rapidly approached as far as the hypothetical circle connecting the tips of the teeth of the ratchet wheel 16, the movement of the pawl 32 is slowed in the large hole portion 20a of the guide hole 20 and the pawl 32 engages with the ratchet wheel 16.

Thus, when acceleration of the vehicle body or abnormal inclination of the vehicle body is detected by the detector mechanism 27, an inertial actuating force causes the lock plate 17 to become linked with the reel shaft 15

When the pawl 32 and the ratchet wheel 16 are engaged, because the pawl 32 is of two-tooth structure, the load on the teeth is dispersed and the load on each tooth becomes half of what it is in the case of a single-tooth pawl. Consequently, compared with the case of a single-tooth pawl, the pawl and ratchet have the strength to withstand twice as much torque.

When the outer diameter of the ratchet wheel is made small without the number of teeth being changed, a reduction in size of approximately 70% can be achieved without detriment to the locking performance of the retractor.

Also, if the downsizing of the ratchet wheel 16 is made slightly more moderate and the torque strength is made the same as that of a single-tooth pawl, the number of teeth on the ratchet wheel 16 will be increased and the locking performance of the retractor can be improved.

When during a collision the vehicle undergoes a large acceleration or deceleration, the detecting means 27 detects this, the pendulum 28 inclines and the claw portion 29 rises and engages with the latch gear 26.

The movement of the latch gear 26 and the projecting portions 31 integral with the inertia weight 30 frictionally connected to the latch gear 26 is stopped. At this time, because the reel shaft 15 and the plate 21 fixed to the end of the reel shaft 15 start to rotate further in the counterclockwise direction, the lock member 23 pivotally supported on the pin 22 projecting from the plate 21 also starts to rotate; however, because the projections 31 are stationary, the lock member 23 is caused to move along the projections 31 and the engaging claw 25 of the lock member 23 engages with the internal ratchet 18.

In this way, the inertial actuator mechanism operates and the reel shaft 15 and the lock plate 17 are linked together.

When the lock member 23 and the internal ratchet 18 engage, the lock plate 17 rotates together with the reel shaft 15. Therefore, the support pin 34 slides along the side surface of the guide hole 20 and the pawl 32 pivots in the clockwise direction of FIG. 3, and the pawl 32 and the ratchet wheel 16 engage.

Figure 3:
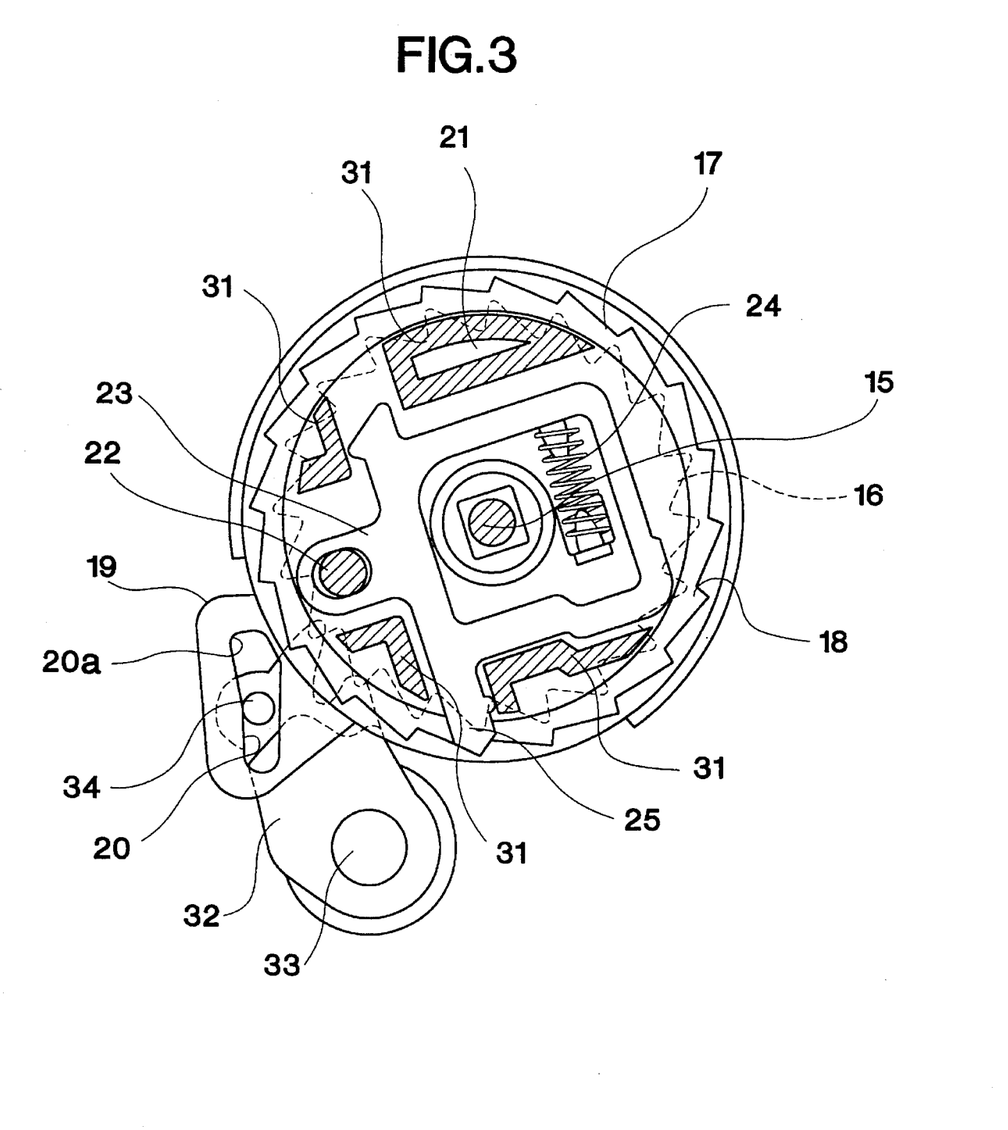
FIG. 3 is a sectional view illustrating the primary part of the internals of the lock plate 17 in a transient state occurring when the reel shaft of the seat belt retractor of the present invention is in the process of being locked.
Figure 4:
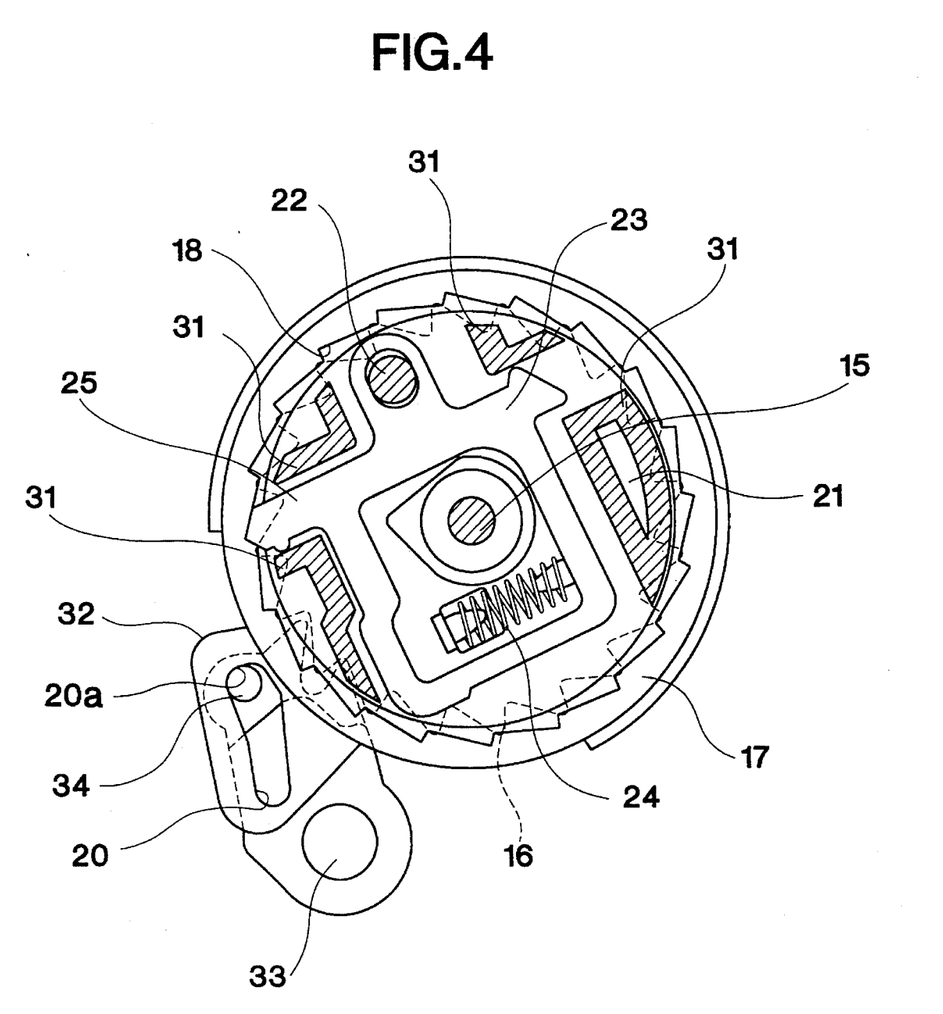
FIG. 4 is a longitudinal sectional view illustrating the primary part of the internals of the lock plate 17 when the webbing reel shaft of the seat belt retractor of the present invention is in the looked state.

Thus, the rotation of the reel shaft 15 in the withdrawal direction of the webbing 14 is arrested.

Also, when the pawl 32 and the ratchet wheel 16 engage, the pawl 32, guided by the side surface of the guide hole 20, pivots in the direction in which it engages with the ratchet wheel 16. When the pawl has reached the hypothetical circle connecting the tips of the teeth of the ratchet wheel 16, the movement of the pawl 32 decelerates down in the large hole portion 20a of the guide hole 20 before the pawl 32 engages with the ratchet wheel 16.

Therefore, the pawl 32 timely engages with the ratchet wheel 16 without fail Also, when the two are engaged, because there is the large hole portion 20a of the guide hole 20, no excessive forces are exerted on the guide hole 20 or the like.

As described above, giving the pawl a two-tooth construction makes it possible to make the outer diameter of the ratchet wheel small and reduce the size of the retractor.

Furthermore, because it is possible to reduce the size of the retractor and increase the number of teeth on the ratchet wheel compared to the numbers of teeth that have conventionally been used, it is possible to reduce the angle through which the reel shaft rotates before it is locked when the emergency locking mechanism operates; the locking performance can be improved, the engagement of the pawl and the ratchet wheel can be brought about rapidly, reliably and timely, and no excessive forces are involved.

Next, a retractor for achieving the second objective mentioned above will be described.

This retractor has the following characteristics:

A seat belt retractor provided with a clamp device mounted with the webbing that has been withdrawn from the webbing reel shaft and a clamp actuator arm for actuating the clamp device by moving in linkage with the rotation of the lock plate, the clamp device comprising first and second clamp members disposed facing each other with the webbing between them and a clamp case for holding the first clamp member in such a way that it can move toward and away from the second clamp member and holding both of the clamp members in such a way that they can simultaneously move in the direction of the length of the webbing, which clamp actuator arm is pivotally mounted on the frame and has its end portion fitted in a channel in the first clamp member and moving in linkage with the lock plate pivots in the webbing withdrawal direction and pushes the first clamp member toward the second clamp member; wherein the end portion of the clamp actuator arm has a circular arcuate surface which in cross section forms part of a circle having a diameter greater than the thickness of this end portion and having its center inclined to the webbing reel shaft from the centerline of the clamp actuator arm.

In this seat belt retractor the end portion of the clamp actuator arm is preferably provided with a claw which engages with a portion of the first clamp member and when the clamp device is not being actuated causes the first clamp member to lean and move away from the second clamp member.

Furthermore, in this seat belt retractor the clamp actuator arm and the first clamp member, and the back of the second clamp member and the frame, preferably only make contact in their cross direction central portions.

A preferred embodiment of this retractor will now be described with reference to the accompanying drawings.

In the drawings, reference numeral 11 denotes a frame, and the frame 11 is made up of a back plate 12 and side plates 13a, 13b mounted at each end of the back plate 12 perpendicular thereto and facing each other.

A webbing reel shaft 15 is rotatably mounted on the side plates 13a, 13b, and a webbing 14 is wound on the webbing reel shaft 15 between the side plates 13a, 13b.

A spiral spring 6 is mounted at one end of the webbing reel shaft 15, and the webbing reel shaft 15 is at all times rotationally urged by the spiral spring 6 in the direction in which it takes up the webbing 14.

A ratchet wheel 16 is mounted on the other end, which projects from the side plate 13a, of the webbing reel shaft 15, in such a way that it rotates together with the webbing reel shaft 15. A pawl 32 is pivotally mounted on the side plate 13a by way of a pin 34 projecting from the outer side thereof and by pivoting about a pin 34 can move between a position in which it engages with the ratchet wheel 16 and a position in which it does not, and by spring means (not shown in the drawings) is urged at all times toward the position in which it does not engage with the ratchet wheel 16.

A lock plate 17 is mounted on the webbing reel shaft 15 rotatably with respect thereto on the outer side of the ratchet wheel 16, and an internal ratchet 18 is integrally formed on an inner circumferential surface of the lock plate 17.

A plate base 55 and a guide plate 19 extend from the circumferential periphery of the lock plate 17. A pin 34 implanted in the pawl 32 fits in a guide hole 20 formed in the guide plate 19, and the arrangement is such that when the lock plate pivots in the counterclockwise direction of the drawings it causes the pawl 32 to pivot clockwise and engage with the ratchet wheel 16.

A plate 21 is mounted so that it rotates integrally with the webbing reel shaft 15, and a lock member 23 is pivotally mounted on a pin 22 implanted in the plate 21.

This plate 21 and lock member 23 are disposed inside the internal ratchet 18, and the arrangement is such that when the lock member 23 pivots it causes an engaging claw 25 formed on the lock member 23 to engage with the internal ratchet 18; by a spring 24 interposed between the plate 21 and the lock member 23 the engaging claw 25 is urged in a direction in which it does not engage with the internal ratchet 18.

An inertia weight 30 is mounted on the webbing reel shaft 15 rotatably with respect thereto on the outer side of the lock member 23. Projecting portions 31 project from the side of the inertia weight 30 which faces the lock member 23. The arrangement is such that when the webbing reel shaft 15 suddenly rotates with respect to the inertia weight 30 in the webbing withdrawal direction, the action of the inertial force of the inertia weight causes the lock member 23 to oscillate along the projecting portions 31 with respect to the plate 21 against the resistance of the spring 24 and causes the engaging claw 25 to engage with the internal ratchet 18.

A latch gear 26 is mounted on the webbing reel shaft 15 rotatably with respect thereto on the outer side of the inertia weight 30, and this latch gear 26 is frictionally engaged with the inertia weight 30.

A detector mechanism 27 is mounted on the side plate 13a. A pendulum 28 is mounted vertically inside a pendulum case 61, and a claw member 29 pivotally mounted on the case 61 is positioned on top of the pendulum 28.

The pendulum 28 is mounted in such a way that it is normally vertical inside the pendulum case 61 but when the vehicle accelerates or decelerates or inclines abnormally it inclines to lift the claw member 29 and cause it to engage with the latch gear 26.

A cam member 53 is pivotally mounted on the top part of the side plate 13a. A roller 54 mounted on the end of the cam member 53 passes through a long hole 56 formed in the plate base 55 of the lock plate 17. The arrangement is such that when the lock plate pivots it causes the cam member 53 to pivot. A cam projection 57 is formed on the side edge of the cam member 53.

A clamp actuator arm 58 is pivotally mounted on the side plates 13a, 13b above the cam member 53. A pin 59 projects from the side of the clamp actuator arm 58 and passes through a long hole 60 formed in the side plate 13a and abuts with the cam projection 57 of the cam member 53. The cam member 53 is urged by spring means 35 in the direction in which the pin 59 is pushed upon by the cam projection 57.

A clamp device 36 is mounted on the upper part of the frame 11. In the clamp device 36, a clamp case 37 is mounted on the upper part of the frame 11 and a support plate 38 is mounted at the back of the clamp case 37 along the back plate 12 of the frame 11. Slits 39 and 40, through which the webbing 14 passes, are formed in the top and bottom portions of the clamp case 37, and a slide window 41 is formed on each side of the clamp case 37.

A sliding frame 42 is disposed in such a way that it can slide up and down inside the clamp case 37 along the slide windows 41, and a second clamp member 43 is mounted on the rear side of the sliding frame 42. A first clamp member 44 is disposed in front of the second clamp member 43 facing the second clamp member 43, and this first clamp member 44 is mounted in through holes 45 formed in the sides of the sliding frame 42 and is movable toward and away from the second clamp member 43.

In this clamp device 36, the webbing 14 withdrawn from the webbing reel shaft 15 passes through the slit 40, passes between the first clamp member 44 and the second clamp member 43 and is withdrawn upward through the slit 39. Mutually meshing corrugations 46 are formed in the facing surfaces of the first clamp member 44 and the second clamp member 43. The arrangement is such that when the first clamp member 44 moves near to the second clamp member 43 the webbing 14 is clamped between the corrugations 46 and the movement of the webbing 14 is arrested.

A channel 47 is formed in the front side of the first clamp member 44, and the end portion 48 of the clamp actuator arm 58 is fitted in the channel 47. The arrangement is such that when the clamp actuator arm 58 pivots upward it causes the first clamp member 44 to approach the second clamp member 43 and also causes both of the clamp members 43, 44 to slide upward together with the slide frame 42.

Claws 49, 50 are formed in the channel 47 and the lower side of the end portion 48 of the clamp actuator arm 58, and when the end portion 48 is in place in the channel 47 the two claws 49, 50 are mutually engaged. The arrangement is such that when the clamp actuator arm 58 swings in the downward direction of the drawings it causes the first clamp member 44 to lean and move away from the second clamp member 43.

Figure 9:
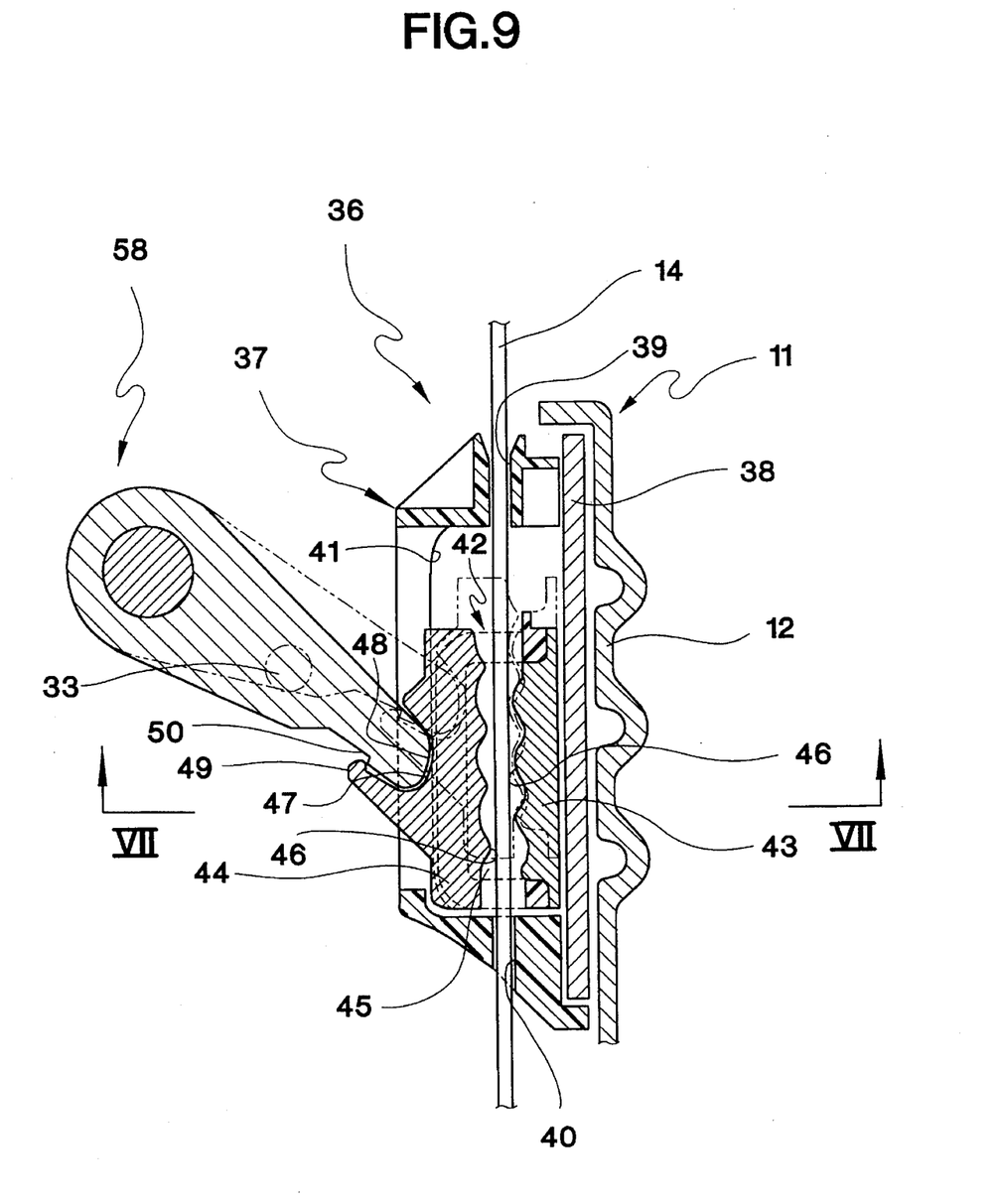
FIG. 9 is a sectional view along V—V of the clamping device 36 of the retractor shown in FIG. 6.
Figure 10:
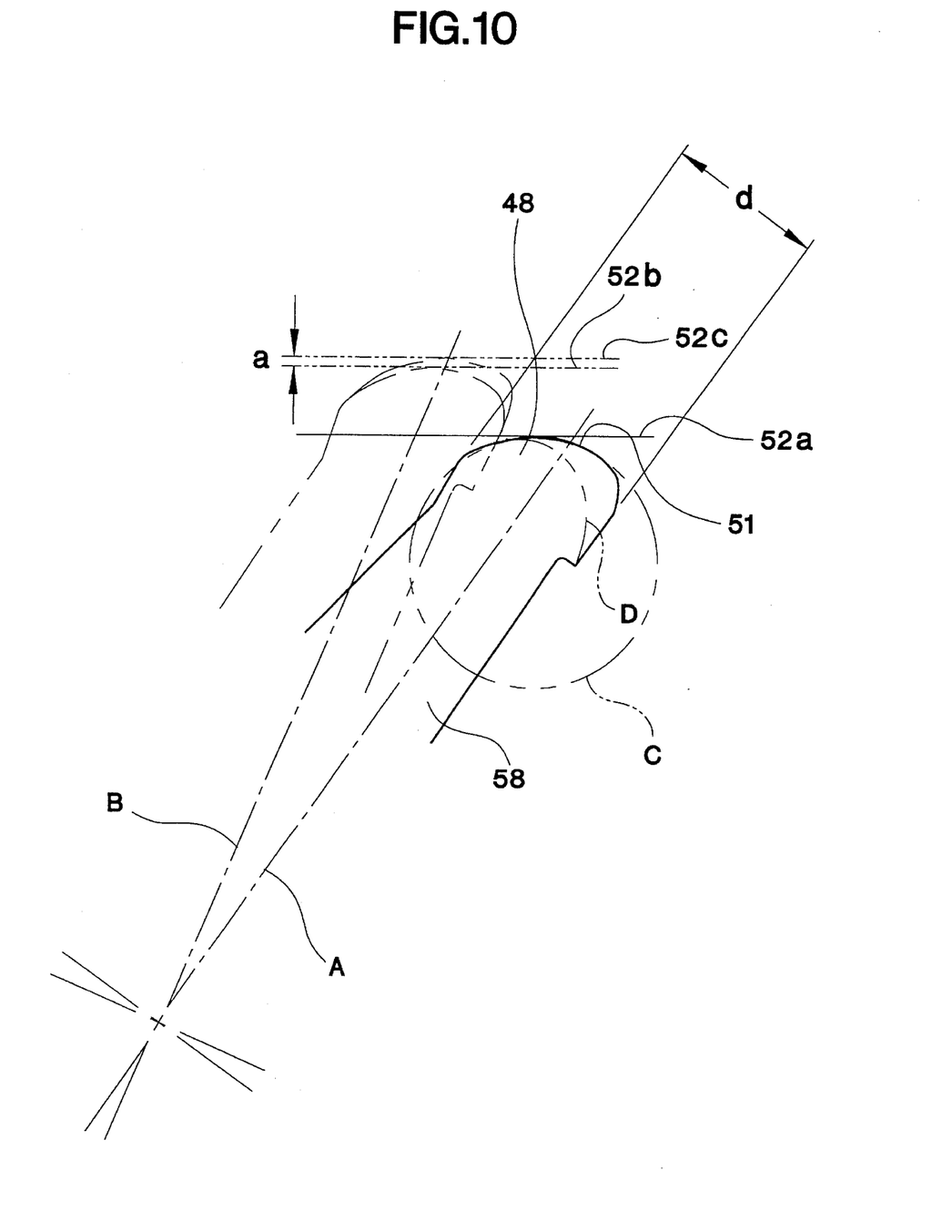
FIG. 10 is a view illustrating in further detail the portions of the end portion 48 of the clamp actuator arm 58 which make contact with the first clamp member 44.

The end portion 48 of the clamp actuator arm 58 is formed into a circular arcuate surface 51 as shown in FIGS. 9 and 10. In its cross section the circular arcuate surface 51 forms part of a circle C having a diameter greater than the thickness of the end portion 48 of the clamp actuator arm 58 and whose center is inclined to the webbing reel shaft 15 from the centerline A of the clamp actuator arm 58.

When the clamp actuator arm 58 has pivoted downward, as shown by a solid line in FIG. 10, it abuts with the front surface 52a of the first clamp member 44 at a relatively high position on the circular arcuate surface 51, and when the clamp actuator arm 58 swings upward, as shown by a broken line in FIG. 10, it pushes the first clamp member 44 in the direction of the back plate 12 and also the end portion 48 of the clamp actuator arm. 58 abuts with the front surface 52b of the first clamp member 44 at a relatively low position on the circular arcuate surface 51.

In the clamp device 36, the end portion 48 of the clamp actuator arm 58 is fitted in the channel 47 in abutment with the front side of the first clamp member 44, and when the clamp actuator arm 58 pivots upward the webbing 14 is clamped between the first clamp member 44 and the second clamp member 43, the second clamp member 43 abuts with the support plate 38, and the support plate 38 is supported by the back plate 12 of the frame 11.

Figure 11:
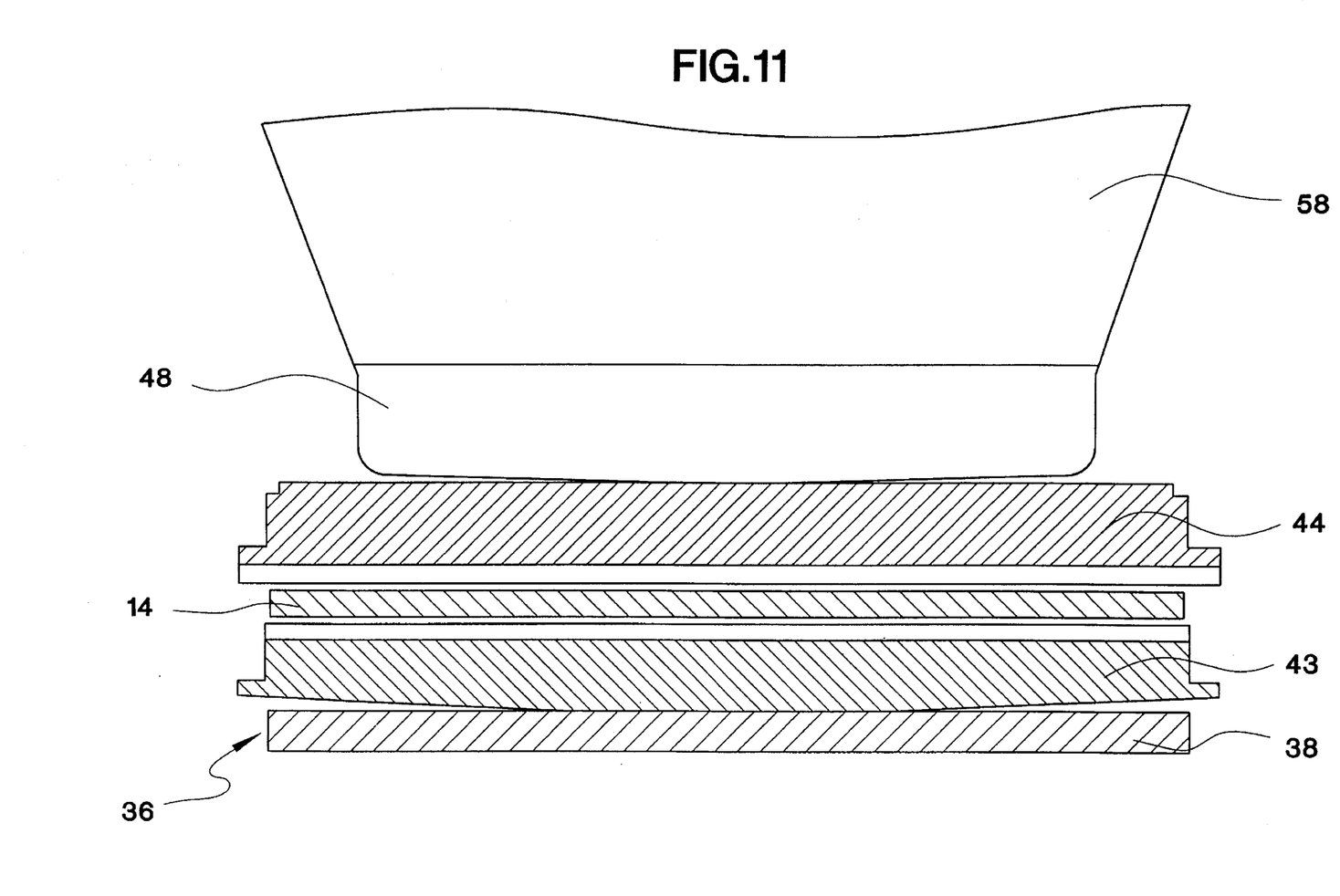
FIG. 11 is a sectional view along VII—VII of the clamp device 36 shown in FIG. 9.

Here, in this preferred embodiment, as shown in FIG. 11, the central portion of the end portion 48 of the clamp actuator arm 58 projects slightly, and both edge portions form a slight taper, becoming narrower. Also, both edges of the back of the second clamp member 43 form a slight taper, becoming thinner. As a result, when the end portion 48 of the clamp actuator arm 58 pushes upon the first clamp member 44 and thereby clamps the webbing 14 between the first clamp member 44 and the second clamp member 43, the load is mainly applied to the central parts of the clamps 43 and 44.

The pawl 32 and the ratchet wheel 16 are disposed in positions such that when the pawl 32 engages with the ratchet wheel 16 it does so after the webbing 14 has been clamped by the first clamp member 44 and the second clamp member 43.

The webbing 14 is accommodated in the retractor with its anchored end portion wound around the webbing reel shaft 15. Webbing 14 withdrawn from the webbing reel shaft 15 passes between the second clamp member 43 and the first clamp member 44 in the clamp device 36 and is drawn out in the upward direction of the drawings and constitutes part of a vehicle passenger compartment seat belt system.

Figure 5:
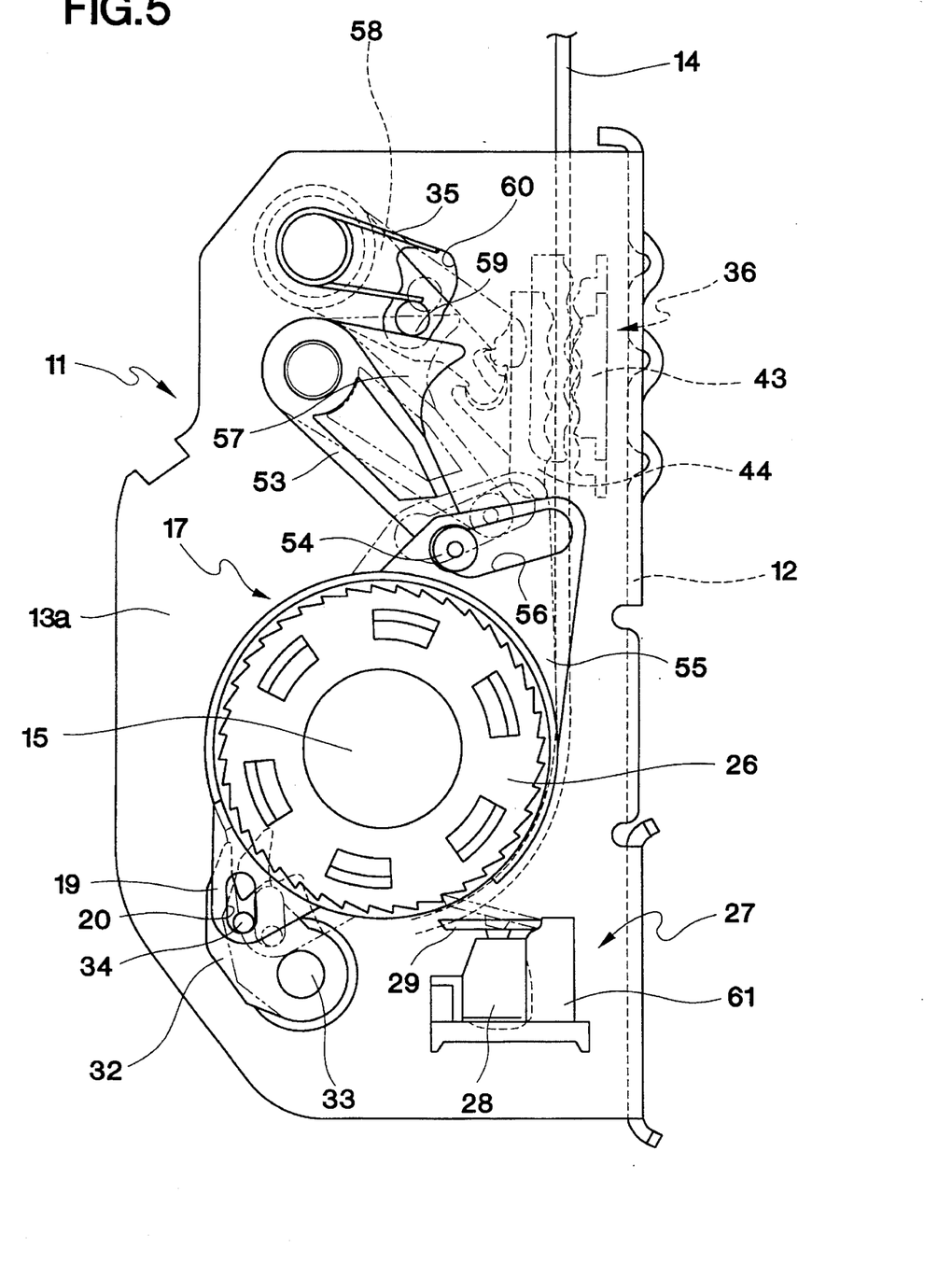
FIG. 5 is a schematic side elevational view illustrating the clamp device 36 of the seat belt retractor of the present invention.

When the retractor is in the normal state, the pendulum 28 of the detector mechanism 27 is vertical in the pendulum case 61, and the claw 29 is lowered as shown by a solid line in FIG. 5 and is not engaged with the latch gear 26.

Figure 7:
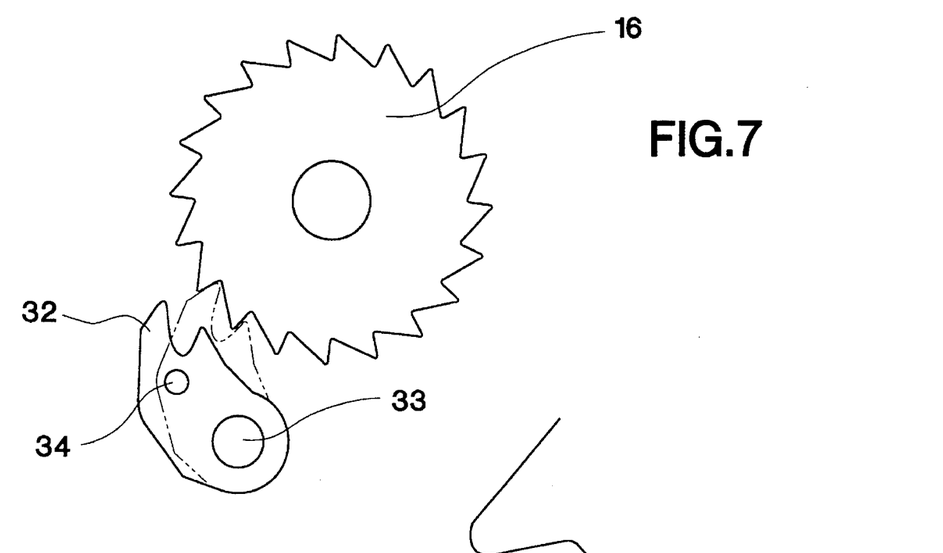
FIG. 7 is a sectional view taken along IV—IV of FIG. 6 illustrating the engaging relationship between the ratchet wheel 16 and the pawl 32 of the retractor shown in FIG. 6.
Figure 8:
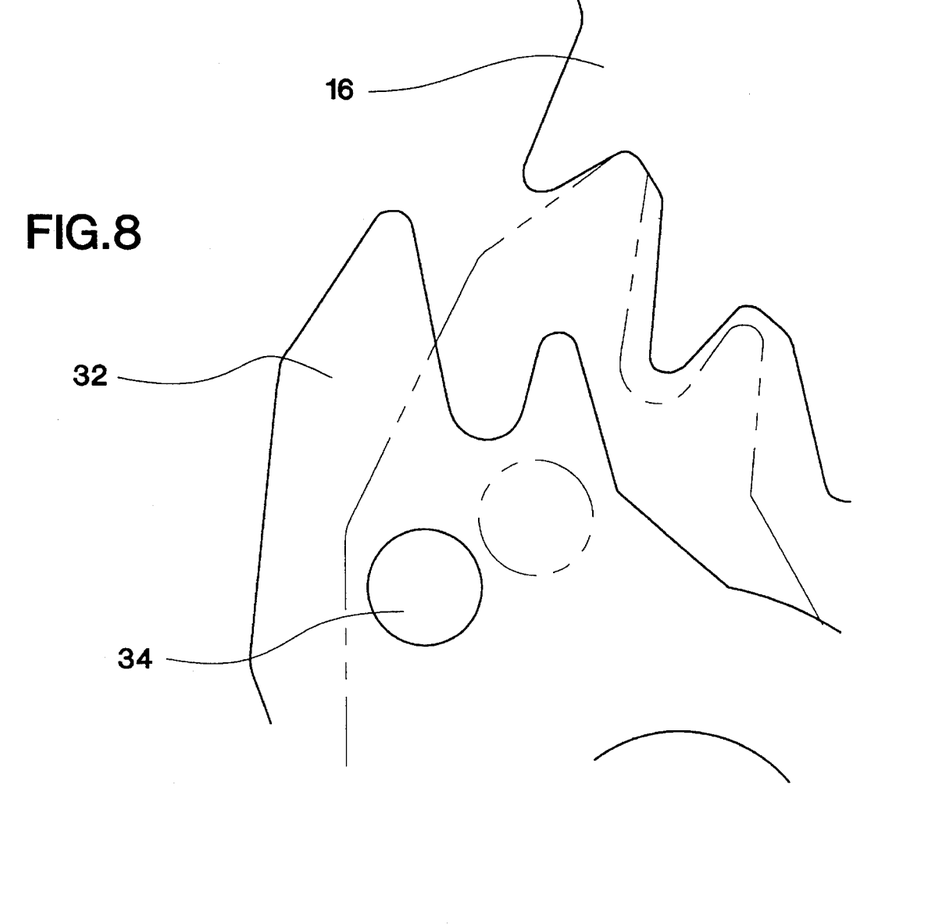
FIG. 8 is an enlarged view of the engaging relationship between the ratchet wheel 16 and the pawl 32 of FIG. 7.

The lock member 23 is held with respect to the plate 21 by the elastic force of the spring 24 in a position wherein the engaging claw 25 does not engage with the internal ratchet 18. The pawl 32 is held by the action of spring means (not shown) in the position shown by a solid line in FIGS. 5 and 7 in which it lies when it has pivoted counterclockwise about the pawl pivot 33, and is not in engagement with the ratchet wheel 16.

Therefore, the webbing reel shaft 15 can rotate freely with respect to the frame 11, and if the webbing reel shaft 15 rotates, the ratchet wheel 16 and the plate 21 also rotate integrally with it. If the plate 21 rotates, the lock member 23, which is held in a fixed position relative to the plate 21 by the spring 24, rotates together with the plate 21, and also the inertia weight 30 rotates along with the lock member 23, and the latch gear 26 which is frictionally engaged with the inertia weight 30 also rotates integrally with the webbing reel shaft 15.

Because the engaging claw 25 is not engaged with the internal ratchet 18, the lock plate 17, which is mounted on the webbing reel shaft 15 rotatably with respect thereto, is unconnected with the rotation of the webbing reel shaft 15. As a result of the action of the guide hole 20 and the supporting pin 34 when the pawl 32 pivoted counterclockwise the lock plate 17 is in the position in which it lies when it has pivoted clockwise with respect to the frame 11, as shown by a solid line in FIG. 5.

The clamp actuator arm 58, has been caused to pivot clockwise by the spring force of the spring means 35, and the action of the pin 59 of the clamp actuator arm 58. The cam projection 57 of the cam member 53 has caused the cam member 53 to also pivot clockwise. As shown by a solid line in FIG. 5 the roller 54 is positioned at the leftmost extremity (see FIG. 5) of the long hole 56 formed in the plate base 55 of the lock plate 17.

In the clamp device 36, the sliding frame 42 has slid downward along the slide windows 41 and the first clamp member 44 is positioned away from the second clamp member 43, and the webbing 14 can pass freely between the two clamp members 43 and 44.

Figure 6:
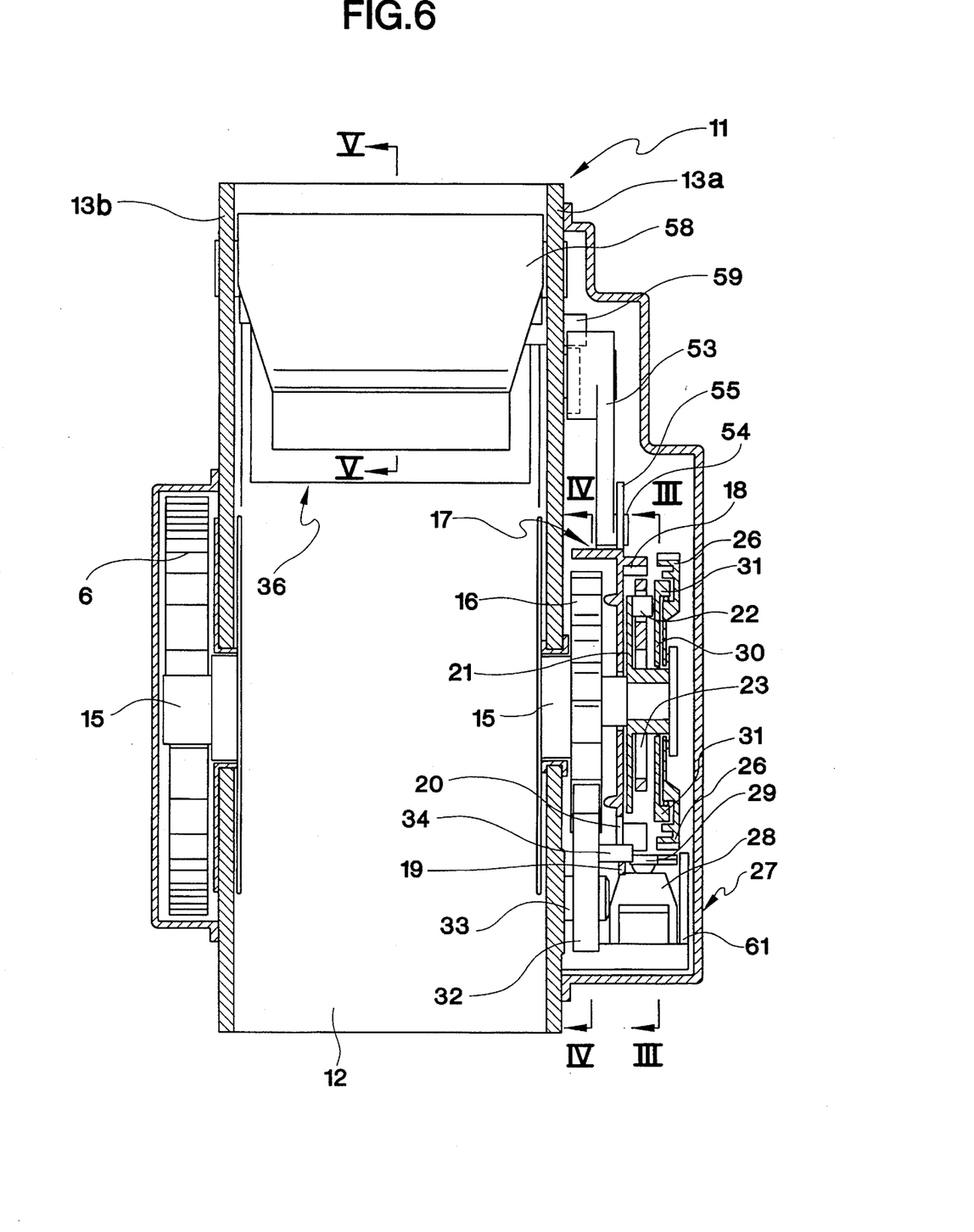
FIG. 6 is a longitudinal sectional view of the device in the schematic side elevational view of FIG. 5.

When the seat belt is not in use, the webbing reel shaft 15 has rotated in the clockwise direction of the drawings under the elastic force of the spiral spring 6 (FIG. 6), and the webbing 14 has thereby been retracted and wound around the periphery of the webbing reel shaft 15.

When the seat belt is to be used, pulling the webbing 14 out from the retractor causes the webbing 14 to rotate the webbing reel shaft 15 counterclockwise against the resistance of the spiral spring 6 while at the same time unreeling from the webbing reel shaft 15, and it is drawn out between the first clamp member 44 and the second clamp member 43 of the clamp device 36 and can be worn.

When the seat belt is being worn, a winding forge exerted by the spiral spring 6 acts on the webbing 14 constantly. Consequently the webbing fits optimally on the body of the wearer, and because when the wearer moves his body extra webbing 14 wound on the webbing reel shaft 15 is drawn out and then retracted again the wearer can move his body freely in the vehicle interior.

When due to an accident or the like the vehicle accelerates abnormally or becomes abnormally inclined, the pendulum 28 inclines in the pendulum case 61 and lifts the claw member 29 whose end then engages with the latch gear 26.

When the webbing 14 is then withdrawn from the retractor and the webbing reel shaft 15 rotates in the counterclockwise direction of FIG. 5, because the latch gear 26 is engaged with by the claw member 29 and can no longer rotate, the rotation of the inertia weight 30, which is frictionally engaged with the latch gear 26, is also stopped, and a relative movement occurs between the inertia weight 30 and the plate 21 fixed to the webbing reel shaft 15. As a result, the look member 23 swings with respect to the plate 21 against the resistance of the elastic forge of the spring 24 along the projections 31 on the inertia weight 30, and the engaging claw 25 projects circumferentially and engages with the internal ratchet 18.

Also, when the body of the seat belt wearer moves suddenly in the vehicle interior and the webbing 14 is rapidly withdrawn by this movement, the webbing reel shaft 15 rapidly rotates and the plate 21 rotates together with the webbing reel shaft 15. However, because of its inertia a delay occurs in the rotation of the inertia weight 30, and a relative movement occurs between the plate 21 and the inertia weight 30. As a result, the lock member 23 moves in the same way as that described above and the engaging claw 25 projects radially and engages with the internal ratchet 18.

When the engaging claw 25 has thus engaged with the internal ratchet 18, if a further withdrawing force acts on the webbing 14, the plate 21 rotates together with the rotation of the webbing reel shaft 15. Because the engaging claw 25 of the lock member 23 is engaged with the internal ratchet 18, the lock plate 17 is also caused to rotate counterclockwise along with the plate 21 together with the webbing reel shaft 15.

When the lock plate 17 is rotated counterclockwise, as shown by broken lines in FIG. 5, the guide hole 20 formed in the guide plate 19 pushes the supporting pin 34 rightward and the pawl 32 pivots clockwise about the pin 33 and engages with the ratchet wheel 16 and locks the rotation of the webbing reel shaft 15.

Meanwhile, when the lock plate 17 rotates counterclockwise, the long hole 56 in the plate base 55 pushes the roller 54 upward, and the cam member 53 pivots counterclockwise, as shown by broken lines in FIG. 5. As a result the cam projection 57 pushes up the pin 59, and the clamp actuator arm 58 also rotates counterclockwise against the resistance of the elastic force of the spring means 35.

This causes the end portion 48 of the clamp actuator arm 58 to move rightward and upward as shown by broken lines in FIGS. 9 and 10, causing the first clamp member 44 to move toward the second clamp member 43 and causing the two clamp members 43 and 44 to slide upward together with the sliding frame 42, clamping the webbing 14 between the corrugations 46 of the clamp members 43 and 44.

As a result, as well as withdrawal of the webbing 14 being arrested by the webbing reel shaft 15 being locked, withdrawal of the webbing 14 due to tightening of the roll of the webbing 14 wound on the webbing reel shaft 15 is also prevented, by the webbing 14 being clamped in the clamp device 36, and the body of the seat belt wearer is held more securely.

Also, if while the webbing 14 is clamped a further withdrawing force acts on it, the clamp members 43 and 44 between which the webbing 14 is clamped are moved upward by a frictional force acting between them and the webbing 14 and act to further pivot the clamp actuator arm 58, whose end portion 48 is fitted in the channel 47 in the first clamp member 44, counterclockwise. As a result of this pivoting the first clamp member 44 moves still closer to the second clamp member 43 and clamps the webbing 14 still more strongly.

In this device, because the end portion 48 of the clamp actuator arm 58 has a circular arcuate surface 51 which in cross section forms part of a circle C having a diameter greater than the thickness of the end portion 48 of the clamp actuator arm 58 and whose center is offset toward the webbing reel shaft 15 from the centerline of the clamp actuator arm 58, when the centerline of the clamp actuator arm 58 has moved from position A to position B in FIG. 10, the part of the circular arcuate surface 51 of the clamp actuator arm 58 which abuts with the first clamp member 44 moves from a relatively high position to a relatively low position, and the clamp actuator arm 58 moves the first clamp member 44 from the position of line 52a to the position of line 52c.

If the end portion 48 was symmetrical about the centerline of the clamp actuator arm 58 and shaped in a circular arc D having a diameter approximately equal to the thickness of the end portion 48, as in the case of a conventional clamp actuator arm, then by pivoting from its lower position to its upper position the clamp actuator arm 58 could only move the first clamp member 44 from the position of line 52a to the position of line 52b.

That is, in this device, in the clamp actuator arm 58 pivoting through the same angle from A to B, the moving distance of the first clamp member 44 can be increased by a distance corresponding to the distance [a] in FIG. 10, and the speed with which the webbing 14 is clamped can therefore be raised.

The distance [a] in FIG. 10 is small, and the difference in the time taken to clamp the webbing 14 is small; however, to restrain the body of a seat belt wearer in an emergency a rapid action of the order of milliseconds is required, and the difference in distance shown by [a] comes to have great significance. In practice, this distance [a] is usually about 0.2 mm, but when this distance increase [a] is achieved the increase makes a difference of several cm to the position in which the body of the seat belt wearer is held in an accident. Such a difference can determine whether the seat belt wearer survives the accident or not.

When the emergency situation is over and withdrawing forces stop acting on the webbing 14, the webbing reel shaft 15 rotates clockwise and winds the webbing 14, the pawl 32 is returned by the elastic force of the above-mentioned spring means to the position in which it does not engage with the ratchet wheel 16, the lock member 23 is returned by the spring 24 to the position in which it does not engage with the internal ratchet 18, the pendulum 28 returns to the vertical in the detector mechanism 27, and the claw 29 moves downward and disengages from the latch gear 26.

As the lock plate 17 returns to its original position the cam member 53 pivots clockwise and the clamp actuator arm 58 also pivots clockwise under the elastic force of the spring means 35. The claw 50 on the end portion 48 of the clamp actuator arm 58 engages with the claw 49 on the channel 47 in the first clamp member 44 and draws the first clamp member 44 forward and downward, the first clamp member 44 moves away from the second clamp member 43 and the sliding frame 42 slides downward along the slide windows 41.

Thus the retractor returns to its initial state and retraction and withdrawal of the webbing 14 becomes possible again.

When the clamp actuator arm 58 pivots counterclockwise and the clamp device 36 clamps the webbing 14 with a large force, because the clamp actuator arm 58 pushes on the cross direction central portion of the first clamp member 44, and because the second clamp member 43 is supported by the support plate 38 in its central portion, the first clamp member 44 and the second clamp member 43 clamp the webbing 14 mainly with their central portions, and there is no strong gripping and consequent no damaging of the side edge portions of the webbing 14.

According to the device of this invention, in an emergency the first clamp member 44 is moved rapidly along with the pivoting of the clamp actuator arm 58, and the webbing 14 can be clamped and the body of the seat belt wearer secured in a very short period of time.

When the emergency situation is over, the first clamp member 44 moves away from the second clamp member 43 and the clamping of the webbing 14 is released.

Because when the clamp device 36 clamps the webbing 14 the clamping force is applied mainly to the central portion of the webbing 14, there is no damaging of the side edge portions of the webbing 14.

We claim:

1. A seat belt retractor for mounting on a vehicle body, comprising:

a frame;

a webbing reel shaft rotatably mounted on the frame;

a lock plate rotatably mounted on the webbing reel shaft;

inertial detecting means for detecting acceleration of the vehicle body, abnormal inclination of the vehicle body and/or rapid rotation of the webbing reel shaft in the webbing withdrawal direction and linking the lock plate to the webbing reel shaft; and locking means for locking the rotation of the webbing reel shaft when actuated by a rotation of the lock plate accompanying a rotation of the webbing reel shaft when the lock plate and the webbing reel shaft are linked together, the locking means comprising a ratchet wheel which rotates integrally with the webbing reel shaft and a pawl pivotally mounted on the frame and urged away from the ratchet wheel which pawl engages with the ratchet wheel guided by a guide hole formed in the lock plate;

wherein the pawl comprises two teeth and the pawl and the ratchet wheel are positioned in such a way that when the load on the webbing is relatively small only one of the teeth of the pawl engages with a tooth of the ratchet wheel and there is a small gap between the other tooth of the pawl and the tooth of the ratchet wheel corresponding thereto and when the load on the webbing is relatively large, both of the teeth of the pawl engage with teeth of the ratchet wheel, by elastic deformation.

2. A seat belt retractor according to claim 1, wherein the guide hole formed in the lock plate engages with a support pin mounted on the pawl and is of a curved shape such that the two teeth of the pawl move to the addendum circle of the ratchet wheel rapidly and then decelerate before engaging with the ratchet wheel.

3. A seat belt retractor according to claim 2, wherein the portion of the guide hole where the pawl and the ratchet wheel are engaged is large.

4. A seat belt retractor for mounting on a vehicle body, comprising:

a frame;

a webbing reel shaft rotatably mounted on the frame;

a lock plate rotatably mounted on the webbing reel shaft;

inertial detecting means for detecting acceleration of the vehicle body, abnormal inclination of the vehicle body and/or rapid rotation of the webbing reel shaft in the webbing withdrawal direction and linking the lock plate to the webbing reel shaft;

locking means for locking the rotation of the webbing reel shaft when actuated by a rotation of the lock plate accompanying a rotation of the webbing reel shaft when the lock plate and the webbing reel shaft are linked together, the locking means comprising a ratchet wheel which rotates integrally with the webbing reel shaft and a pawl pivotally mounted on the frame and urged away from the ratchet wheel which pawl engages with the ratchet wheel guided by a guide hole formed in the lock plate;

a clamp device mounted for clamping the webbing withdrawn from the webbing reel shaft and a clamp actuator arm for actuating the clamp device by moving in cooperation with the rotation of the lock plate, the clamp device comprising first and second clamp members disposed facing each other with the webbing between them and a clamp case for holding the first clamp member in such a way that it can move toward and away from the second clamp member and holding both of the clamp members in such a way that they can simultaneously move in the length direction of the webbing, which clamp actuator arm is pivotally mounted on the frame and has its end portion fitted in a channel in the first clamp member and moving in cooperation with the lock plate pivots in the webbing withdrawal direction and pushes the first clamp member toward the second clamp member;

wherein the end portion of the clamp actuator arm has a circular arcuate surface which in cross section forms part of a circle having a diameter greater than the thickness of this end portion and having its center offset toward the webbing reel shaft from a centerline of the clamp actuator arm.

5. A seat belt retractor according to claim 4, wherein the end portion of the clamp actuator arm is provided with a claw which engages with a portion of the first clamp member and when the clamp device is not being actuated causes the first clamp member to move away from the second clamp member.

6. A seat belt actuator according to claim 4, wherein the clamp actuator arm and the first clamp member only make contact in their cross direction central portions and the back of the second clamp member and the frame only make contact in their cross direction central portions.

7. A seat belt according to claim 4, wherein the pawl comprises two teeth and the pawl and the ratchet wheel are positioned in such a way that when the load on the webbing is relatively small only one of the teeth of the pawl engages with a tooth of the ratchet wheel and there is a small gap between the other tooth of the pawl and the tooth of the ratchet wheel corresponding thereto and, when the load on the webbing is relatively large, by elastic deformation both of the teeth of the pawl engage with teeth of the ratchet wheel.

* * * * *